United States Patent [19]

Sciangola

[11] Patent Number: 5,064,871
[45] Date of Patent: Nov. 12, 1991

[54] LATENT CATALYSTS COMPRISING BISMUTH CARBOXYLATES AND ZIRCONIUM CARBOXYLATES

[75] Inventor: Deborah A. Sciangola, Ewing Township, N.J.

[73] Assignee: Essex Specialty Products, Inc., Clifton, N.J.

[21] Appl. No.: 612,724

[22] Filed: Nov. 13, 1990

Related U.S. Application Data

[63] Continuation-in-part of Ser. No. 7,382,527, Jul. 19, 1989, abandoned.

[51] Int. Cl.$^5$ .............................................. C08G 18/14
[52] U.S. Cl. ...................................... 521/124; 528/56; 502/170; 252/182.24; 252/182.27
[58] Field of Search .................... 521/124; 528/56; 502/170; 252/182.24, 182.27

[56] References Cited

U.S. PATENT DOCUMENTS

| | | | |
|---|---|---|---|
| 3,673,159 | 6/1972 | Dikhuzen et al. | 260/77.5 |
| 3,919,173 | 11/1975 | Coyner et al. | 260/77.5 |
| 3,927,053 | 12/1975 | Gallagher et al. | 260/433 |
| 4,110,135 | 8/1978 | Graham et al. | 149/19.4 |
| 4,184,031 | 1/1980 | Graham et al. | 528/55 |
| 4,423,180 | 12/1983 | Brizgys et al. | 524/394 |
| 4,521,545 | 6/1985 | Kerimis et al. | 521/107 |
| 4,582,861 | 4/1986 | Galla et al. | 521/118 |
| 4,584,362 | 4/1986 | Leckart et al. | 528/55 |
| 4,611,044 | 9/1986 | Meyer et al. | 528/56 |
| 4,740,577 | 4/1988 | DeVoe et al. | 528/51 |
| 4,742,090 | 5/1988 | Hunter et al. | 521/124 |
| 4,868,266 | 9/1989 | Meckel et al. | 528/55 |

FOREIGN PATENT DOCUMENTS 909358 5/1961 United Kingdom .

Primary Examiner—Maurice J. Welsh
Attorney, Agent, or Firm—Ann K. Galbraith

[57] ABSTRACT

Disclosed herein is a composition comprising an isocyanate-reactive compound and a catalyst comprising a bismuth carboxylate and a zirconium carboxylate, wherein the catalyst is present in an amount sufficient to catalyze a reaction with the isocyanate-reactive compound and a polyisocyanate. Also disclosed is a process for preparing a composition, which comprises contacting an isocyanate-reactive compound with a polyisocyanate, in the presence of an effective amount of a catalyst comprising a bismuth carboxylate and a zirconium carboxylate, under reaction conditions sufficient to form a composition containing at least one urethane group.

23 Claims, No Drawings

LATENT CATALYSTS COMPRISING BISMUTH CARBOXYLATES AND ZIRCONIUM CARBOXYLATES

This application is a continuation-in-part of 382,527, filed Jul. 19, 1989, now abandoned.

BACKGROUND OF THE INVENTION

This invention relates to catalysts for the reaction between an isocyanate and an isocyanate-reactive compound and, more specifically, to such catalysts which are latent in character.

Catalysts which promote the reaction between an isocyanate and an isocyanate-reactive compound are known and include, for example, many organometal compounds and amine compounds. Bismuth carboxylate catalysts for the production of urethane elastomers and carpet-backing are described, for example, in U.S. Pat. Nos. 4,742,090, 4,584,362, and 4,611,044. Certain organic zirconium compounds useful as catalysts for the production of urethane compounds are disclosed in U.S. Pat. No. 3,673,159. The use of organic zirconium compounds as viscosity-reducing agents in filled liquid polymers is taught in U.S. Pat. No. 4,423,180.

While bismuth carboxylate catalysts are known, their catalytic effect in promoting the cure of isocyanate-containing compositions is such that the rate of cure is generally linear. While such rates of cure are desirable for some applications, a curing rate wherein there is a slow initial build up of viscosity, but also wherein the reaction mixture completely cures, or cures to a tack-free state within a relatively short period of time is also desirable for many applications. An example of such an application is for the cure of a two part urethane adhesive composition, wherein a "pot life" during which the composition may be handled and/or applied to a substrate before it substantially cures, is desired. Certain mercury compounds are known to be useful as latent catalysts, but their use is not desirable for environmental reasons.

SUMMARY OF THE INVENTION

In one aspect, this invention is a composition comprising an isocyanate-reactive compound and a catalyst comprising a bismuth carboxylate and a zirconium carboxylate, wherein the catalyst is present in an amount sufficient to catalyze a reaction with the isocyanate-reactive compound and a polyisocyanate.

In a second aspect, this invention is a process for preparing a composition, which comprises contacting an isocyanate-reactive compound with a polyisocyanate, in the presence of an effective amount of a catalyst comprising a bismuth carboxylate and a zirconium carboxylate, under reaction conditions sufficient to form a composition containing at least one urethane group.

It has been discovered that the use of a zirconium carboxylate in conjunction with a bismuth carboxylate provides a catalyst for the cure of a composition comprising a polyisocyanate and an isocyanate-reactive compound, which catalyst provides curing rates, a pot life, and a post-cured composition hardness which is desirable for many applications such as, for example, in structural adhesive formulations. The curing rate provided by the catalyst is such that the initial buildup of viscosity in the reaction mixture is slower than that obtained by the use of a bismuth carboxylate alone, yet still allows for the reaction mixture to completely cure, or cure to a tack-free state, within a period of time comparable to that obtained by the use of a bismuth carboxylate alone. In addition, the use of the catalyst of the invention will advantageously not discolor the resulting composition.

DETAILED DESCRIPTION OF THE INVENTION

Suitable isocyanate-reactive compounds include any organic compound having at least two isocyanate-reactive moieties, such as a compound containing an active hydrogen moiety, or an imino-functional compound. For the purposes of this invention, an active hydrogen moiety refers to a moiety containing a hydrogen atom which, because of its position in the molecule, displays significant activity according to the Zerewitnoff test described by Wohler in the Journal of the American Chemical Society, Vol. 49, p. 3181 (1927). Illustrative of such active hydrogen moieties are —COOH, —OH, —NH$_2$, —NH—, —CONH$_2$, —SH, and —CONH—. Typical active hydrogen containing compounds include polyols, polyamines, polyamides, polymercaptans and polyacids. Suitable imino-functional compounds are those which have at least one terminal imino group per molecule, such as are described, for example, in U.S. Pat. No. 4,910,279, which is hereby incorporated by reference in its entirety.

The active hydrogen containing compound is characterized by having an average functionality of about 2 to about 5, preferably about 2 to about 3. The active hydrogen containing compound used preferably has an equivalent weight of at least about 400, more preferably at least about 1,000, and most preferably at least about 1,500; and is preferably no greater than about 3,000, more preferably no greater than about 2,500, and most preferably no greater than about 2,000.

Preferably, the active hydrogen-containing compound is a polyol or a mixture of polyols. Suitable polyols include, for example, polyether polyols, polyester polyols, and hydroxyl-containing polythioethers, polyacetals, polycarbonates, or polyester amides which have functionalities and equivalent weights in the above-stated ranges. Polyether polyols are well-known in the art and include, for example, polyoxyethylene and polyoxypropylene diols and triols which are prepared by reacting an unsubstituted or halogen- or aromatic-substituted ethylene oxide or propylene oxide with an initiator compound containing two or more active hydrogen groups such as water, ammonia, a polyalcohol, or an amine. Such methods are described, for example, in U.S. Pat. Nos. 4,269,945, 4,218,543, and 4,374,210, which are hereby incorporated by reference in their entirety. In general, polyether polyols may be prepared by polymerizing alkylene oxides in the presence of an active hydrogen-containing initiator compound.

Suitable alkylene oxides include ethylene oxide, propylene oxide, butylene oxides, styrene oxide, epichlorohydrin, epibromohydrin, and mixtures thereof. Suitable initiator compounds include water, ethylene glycol, propylene glycol, butanediol, hexanediol, glycerin, trimethylol propane, pentaerythritol, hexanetriol, sorbitol, sucrose, hydroquinone, resorcinol, catechol, bisphenols, novolac resins, phosphoric acid, amines, and mixtures thereof.

Polyester polyols are also well-known in the art and may be prepared by reacting a polycarboxylic acid or anhydride thereof with a polyhydric alcohol. Examples of suitable polycarboxylic acids include succinic acid, adipic acid, suberic acid, azelaic acid, sebacic acid, phthalic acid, isophthalic acid, maleic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride, glutaric acid anhydride, fumaric acid, an mixtures thereof. Examples of suitable polyhydric alcohols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof.

The catalyst of the first and second aspects of the invention comprises a bismuth carboxylate and a zirconium carboxylate. The carboxylate portion of the bismuth carboxylate or zirconium carboxylate advantageously comprises a $C_{2-30}$, saturated or unsaturated carboxyl-terminated hydrocarbyl or inertly substituted hydrocarbyl chain. "Inertly substituted" as used herein means that the hydrocarbyl chain contains no substituent group which interferes substantially with the latent catalytic characteristics of the catalyst. The hydrocarbyl chains may be saturated or unsaturated, linear or branched. Of particular interest are hydrocarbyl chains which are branched at the carbon atom adjacent to the carboxyl group, especially $\alpha,\alpha$-dialkyl substituted hydrocarbyl chains. Examples of suitable hydrocarbyl chains include alkyl such as methyl, ethyl, propyl, isopropyl, octyl, neopentyl, neononyl, and neodecyl: cycloalkyl such as cyclohexyl: aryl such as phenyl or napthyl: aralkyl; and alkylaryl such as tolyl. Preferably, the carboxylate portion of the bismuth carboxylate or zirconium carboxylate contains from 6 to 22 carbon atoms. Suitable such carboxylate groups include the residues of fatty acids, as well as branched carboxylates such as neodecanoic acid.

The bismuth carboxylate and zirconium carboxylate may be prepared by contacting a bismuth salt or a zirconium salt with a carboxylic acid containing 2 to 30 carbon atoms under reaction conditions sufficient to from the corresponding bismuth carboxylate or zirconium carboxylate. Bismuth carboxylates and zirconium carboxylates are readily available commercially, and are typically sold as solutions of the bismuth carboxylate or zirconium carboxylate in the corresponding carboxylic acid. Preferred bismuth carboxylates and zirconium carboxylates are bismuth and zirconium salts of $C_{8-12}$ carboxylic acids, such as versatic acid, octoic acid, neodecanoic acid, 2-ethyl hexanoic acid, propionic acid, and mixtures thereof. Especially preferred bismuth carboxylates are bismuth salts of mixtures of $C_{9-11}$ tertiary saturated carboxylic acids. Especially preferred zirconium carboxylates are zirconium salts of mixtures of octoic acid and neodecanoic acid.

The bismuth carboxylate and zirconium carboxylate are employed in an amount sufficient to catalyze a reaction between an isocyanate-reactive compound and a polyisocyanate. Preferably, the bismuth carboxylate and zirconium carboxylate are employed in an amount sufficient to provide a cure time suitable for the particular application for which the catalyst is used. In general, the more zirconium carboxylate is used, the time it more will take for the intial build up of viscosity in the reaction mixture to occur, as shown in the examples which follow. A further limitation on the amount of zirconium carboxylate to be employed applies if the application is for an adhesive or sealant which needs to cure to a tack-free state within a certain period of time, such as, for example, 24 hours. In such cases, excess zirconium carboxylate may not permit the adhesive or sealant to reach a tack-free state within a certain time period, regardless of the amount of bismuth carboxylate employed. Other factors on which the amounts of bismuth carboxylate and zirconium carboxylate to be employed will depend include the degree of reactivity of the isocyanate-reactive compound with the polyisocyanate and their relative concentration, and the application and curing temperatures and humidity. The bismuth carboxylate is preferably present in an amount, based on the weight of the isocyanate-reactive composition, of at least about 0.001 percent, and is preferably no greater than about 0.5 percent. The zirconium carboxylate is preferably present in an amount, based on the weight of the isocyanate-reactive composition, of at least about 0.001 percent, and is preferably no greater than about 0.5 percent.

While the amounts of bismuth carboxylate and zirconium carboxylate are highly dependent on the factors listed above, when the application is for a two-part structural adhesive, the bismuth carboxylate is preferably present in an amount, based on the weight of the isocyanate-reactive composition, of at least about 0.001 percent, more preferably at least about 0.020 percent; and is preferably no greater than about 0.5 percent, more preferably no greater than about 0.1 percent, and most preferably no greater than about 0.020 percent. The zirconium carboxylate is preferably present in an amount, based on the weight of the isocyanate-reactive composition, of at least about 0.001 percent, more preferably at least about 0.020 percent, most preferably at least about 0.035; and is preferably no greater than about 0.5 percent, more preferably no greater than about 0.1 percent, and most preferably no greater than about 0.045 percent.

The composition of the invention may be prepared by combining and mixing the isocyanate-reactive compound, the bismuth carboxylate and the zirconium carboxylate, optionally with chain extenders, cross-linkers, or fillers such as talc, flame retardants, antioxidants, moisture scavengers, colorants, or whiteners. The composition is useful in a reaction with a polyisooyanate compound in the preparation of a urethane-group containing composition. Such compositions are useful to prepare adhesives, elastomers, and coatings.

Suitable polyisocyanates for use in the process of the invention include any compound containing an average at least about 2 isocyanate groups per molecule. Examples of such compounds include aliphatic, cycloaliphatic, araliphatic, aromatic and heterocyclic polyisocyanates. Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and mixtures of these isomers; 1-isocyanato-3,3,5-trimethyl-5-isocyanato methyl cyclohexane (also known as isopherone diisocyanate) (see e.g., German Auslegeschrift No. 1,202,785); 2,4- and 2,6-hexahydrotolylene diisocyanate and mixtures of these isomers, hexahydro-1,3- and/or 1,4-phenylene diisocyanate, perhydro-2,5'-diisocyanate, 1,3- and 1,4-phenylene diisocyanate, toluene-2,4-diisocyanate and tolulene-2,6-diisocyanate and mixtures of these isomers, diphenyl methane-2,4'- and/or 4,4'-diisocyanate, naphthylene-1,5-diisocyanate, triphenyl methane-4,4',4"-triisocyanate, polyphenyl polymethylene polyisocyanates of the type obtained by condensing aniline with formaldehyde, followed by phosgenation and such as described for example in British Patents 874,430 and 848,671, perchlorinated aryl polyisocyanates of the type described in German Auslegeschrift 1,157,601, polyisocyanates containing carbodiimide groups of the type described in German Patent 1,092,007, diisocyanates of the type described in U.S. Pat. No. 3,492,330, polyisocyanates containing allophanate groups of the type described, for example, in British Patent 994,890, in Belgian Patent 761,626 and in published Dutch Patent Application No. 7,102,524, polyisocyanates containing isocyanurate groups of the type described in German Patents 1,022,789; 1,222,067 and 1,027,394 and in German Offenlegungsschrift 1,929,034 and 2,004,048, polyisocyanates containing urethane groups of the type described, for example, in Belgian Patent 752,261 or in U.S. Pat. No. 3,394,164, polyisocyanates containing acrylated urea groups as described in German Patent 1,230,778, polyisocyanates containing biuret groups of the type described, for example, in German Patent 1,101,392, in British Patent 889,050 and in French Patent 7,017,514, polyisocyanates obtained by telomerization reactions of the type described, for example, in Belgian Patent 723,640, polyisocyanates containing ester groups of the type described, for example, in British Patents 965,474 and 1,072,956, in U.S. Pat. No. 3,567,763 and in German Patent 1,231,688 and reaction products of the aforementioned isocyanates with acetals as described in German Patent 1,072,385.

In addition, derivatives of 4,4'-diphenylmethane diisocyanate which are liquid at room temperature such as, for example, polyisocyanates which have carbodiimide groups in their backbone or mixtures thereof may also be used. The preparation of these materials is disclosed in U.S. Pat. No. 3,152,162, which is hereby incorporated by reference in its entirety. An example of a commercial material of this type is Isonate ™ 143L isocyanate, a product of The Dow Chemical Company.

Additional polyisocyanates suitable for use in this invention include those described by W. Siefken in *Justus Liebigs Annalen der Chemie*, 562, pp. 75-136, and in U.S. Pat. Nos. 3,284,479; 4,089,835; 4,093,569; 4,221,876; 4,310,448; 4,359,550 and 4,495,309. Other useful polyisocyanates include polyisocyanates containing carbodiimide groups, urethane groups, allophanate groups, isocyanurate groups, urea groups or biuret groups ("modified polyisocyanates").

Preferred isocyanates are diphenylmethane-4,4'-diisocyanate (MDI), isopherone diisocyanate, toluene-2,4-diisocyanate, toluene-2,6-diisocyanate, and mixtures thereof. Most preferably, the polyisocyanate is MDI. The polyisocyanate may also contain fillers such as talc, flame retardants, antioxidants, moisture scavengers, colorants, and whiteners.

The polyisocyanate may also be a prepolymer of an isocyanate-functional compound and an isocyanate-reactive compound, such that the resulting prepolymer has an average of at least about 2 isocyanate groups per molecule. Any of the polyisocyanates named above may be used as an isocyanate-functional compound in the preparation of the prepolymer, by reacting such a compound with any of the isocyanate-reactive compounds named above.

When fillers such as talc, flame retardants, antioxidants, moisture scavengers, colorants, and whiteners are employed in the prepolymer, the amount of each ingredient in the prepolymer will depend on the isocyanate content and viscosity required for a particular application. For adhesive applications, the ratio of reactants and fillers is preferably controlled so that the resulting prepolymer has a free NCO content of at least about 2 percent, more preferably at least about 3 percent, and most preferably at least about 3.5 percent; and preferably no greater than about 7 percent, more preferably no greater than about 5 percent, and most preferably no greater than about 4 percent. The viscosity of the prepolymer is preferably at least about 4,000 cps, more preferably at least about 7,000 cps; and is preferably no greater than about 20,000, more preferably no greater than about 13,000, when measured using a Brookfield viscometer (#6 spindle, 20 rpm, 77° F.). Preferably, the isocyanate-functional compound used in the preparation of the prepolymer is MDI, isopherone diisocyanate, toluene-2,4-diisocyanate, toluene-2,6-diisocyanate, and mixtures thereof, and is most preferably MDI. Preferably, the isocyanate reactive compound used in the preparation of the prepolymer is a polyether polyol, and is most preferably a polyether polyol with an equivalent weight in the range of from about 300 to about 1,000.

The process of the invention may be carried by combining and mixing an isocyanate-reactive compound, a polyisocyanate, a bismuth carboxylate, and a zirconium carboxylate (all as described above), optionally with fillers such as talc, flame retardants, antioxidants, moisture scavengers, colorants, or whiteners. The process of the invention may be carried out at any temperature and pressure at which the isocyanate-reactive compound will react with the polyisocyanate in the presence of the catalyst. For adhesive applications, the process is preferably carried out at atmospheric pressure at a temperature in the range of from about 18° C. to about 28° C. Preferably, the composition is prepared as a two-component system for ease of use in many applications. In such a system, a first component is prepared by mixing the isocyanate-reactive compound with the bismuth carboxylate and zirconium carboxylate, optionally in the presence of fillers. A second component comprises a polyisocyanate, which is preferably a prepolymer as described above. To use, the two components are combined to form the composition of the invention. Such two-component systems are particularly useful as two-component adhesives for bonding metal-to-metal, and is especially useful for bonding aluminum joints.

The composition and process of the invention are also useful for preparing a wide variety of other polyurethanes such as, for example, in preparing urethane elastomers by molding processes wherein a delayed cure in desirable so that the mold may filled completely before the composition cures substantially. In addition, the process of the invention is also advantageously useful in the preparation of polyurethane coatings. Also, of particular interest is the preparation of polyurethane-backed substrates, especially textiles such as carpet. Such processes are described, for example, in U.S. Pat. Nos. 3,862,879, 4,296,159, 4,696,849, and 4,853,054, which are hereby incorporated by reference in their entirety. In such processes, a cellular or non-cellular polyurethane-forming composition is applied to a surface of a substrate and subsequently cured. In the most preferred embodiment, the substrate is a textile and the applied polyurethane layer is cellular. The cellular nature of the polyurethane layer is obtained by the use of blowing agents, or preferably, by frothing techniques wherein air or other gas is incorporated into the polyurethane-forming composition prior to its application onto the substrate.

ILLUSTRATIVE EMBODIMENTS

The following examples are given to illustrate the invention and should not be interpreted as limiting it in any way. Unless stated otherwise, all parts and percentages are given by weight.

EXAMPLE 1

A polyol composition is prepared by combining a polyester diol with an equivalent weight of about 1500 (19 parts), a polyether diol with an equivalent weight of about 2100 (29 parts), a polyether triol with an equivalent weight of about 1500 (19 parts), talc (19 parts), a u-v stabilizer (0.7 parts), antimony oxide (whitener) (11 parts), titanium dioxide (whitener) (2 parts), carbon black (0.001 parts), a 16 percent by weight solution of bismuth neodecanoate (0.11 parts), and a 21 percent by weight solution of a 50/50 mixture of zirconium octoate and zirconium neodecanoate (0.29 parts).

A prepolymer composition is prepared by combining a polyether diol with an equivalent weight of about 500 (16 parts), chlorinated paraffin (an FR agent) (43 parts), talc (17 parts), an antioxidant comprising 1 part tetrakis(methylene(3-butyl-4-hydroxyhydrocinnamate), 7 parts of a chlorinated paraffin , and 2 parts talc (11 parts), a 3A° molecular sieve (0.5 parts), and MDI (14 parts).

The polyol composition is then mixed with the prepolymer composition, to provide an adhesive with a pot life of at least about 20 minutes at 25° C. The adhesive is applied to a substrate and reaches a tack-free state at 25° C. within about 24 hours.

EXAMPLE 2

A polyol composition is prepared by combining a polyester diol with an equivalent weight of about 1500 (18.76 parts), a polyether diol with an equivalent weight of about 2100 (28.80 parts), a polyether triol with an equivalent weight of about 1500 (19.45 parts), an antioxidant (0.64 parts), talc (13.35 parts), a u-v stabilizer (0.64 parts), antimony oxide (whitener) (10.72 parts), titanium dioxide (whitener) (6.35 parts), 3A° molecular sieves (0.64 parts).

A prepolymer composition is prepared by combining a polyether triol with an equivalent weight of about 500 (19.2 parts), chlorinated paraffin (an FR agent) (49.6 parts), talc (15 parts), and MDI (16.2 parts).

The polyol composition (100 parts) is then mixed in a turbine air mixer with the following amounts, shown in the table below, of a 16 percent by weight solution of bismuth neodecanoate ("Bi") and a 21 percent by weight solution of a 50/50 mixture of zirconium octoate and zirconium neodecanoate ("Zr"), and then mixed with the prepolymer composition in an amount sufficient to result in an NCO:OH group ratio of about 1.2. The examples and comparative examples have the following pot life and shore hardness.

| Example | Bi (%) | Zr (%) | Pot Life (mins.) | Shore "A" Hardness after 24 Hours |
|---|---|---|---|---|
| A (Comp. Ex.) | 0.2 | — | 10 | 25 |
| B | 0.2 | 0.1 | 9.5 | 25 |
| C | 0.2 | 0.2 | 20 | 21 |
| D | 0.2 | 0.4 | 32 | 16 |

EXAMPLE 3

A polyol composition is prepared by combining a polyester diol with an equivalent weight of about 1500 (18.76 parts), a polyether diol with an equivalent weight of about 2100 (28.80 parts), a polyether triol with an equivalent weight of about 1500 (19.45 parts), an antioxidant (0.64 parts), talc (13.35 parts), a u-v stabilizer (0.64 parts), antimony oxide (whitener) (10.72 parts), titanium dioxide (whitener) (6.35 parts).

The polyol composition (100 parts) is then mixed in a planetary mixer with the following amounts, shown in the table below, of a 16 percent by weight solution of bismuth neodecanoate ("Bi") and a 21 percent by weight solution of a 50/50 mixture of zirconium octoate and zirconium neodecanoate ("Zr"), and then mixed with a prepolymer as prepared in Example 2 in an amount sufficient to result in an NCO:OH group ratio of about 1.2. The examples and comparative example have the following pot life and shore hardness.

| Example | Bi (%) | Zr (%) | Pot Life (mins.) | Shore "A" Hardness after 24 Hours |
|---|---|---|---|---|
| A (Comp. Ex.) | 0.14 | — | 6 | 30 |
| B | 0.14 | 0.11 | 9 | 32 |
| C | 0.14 | 0.18 | 12 | 33 |
| D | 0.14 | 0.27 | 15.5 | 35 |

EXAMPLE 4

A polyol composition is prepared by combining a polyester diol with an equivalent weight of about 1500 (21.81 parts), a polyether diol with an equivalent weight of about 2100 (33.49 parts), a polyether triol with an equivalent weight of about 1500 (22.62 parts), an antioxidant (0.74 parts), a u-v stabilizer (0.74 parts), antimony oxide (whitener) (12.47 parts), titanium dioxide (whitener) (7.38 parts), 3A° molecular sieves (0.74 parts).

The polyol composition (100 parts) is then mixed in a planetary mixer with the following amounts, shown in the table below, of a 16 percent by weight solution of bismuth neodecanoate ("Bi") and a 21 percent by weight solution of a 50/50 mixture of zirconium octoate and zirconium neodecanoate ("Zr"), and then mixed with a prepolymer as prepared in Example 2 in an amount sufficient to result in an NCO:OH group ratio of about 1.2. The examples and comparative examples have the following pot life and shore hardness.

| Example | Bi (%) | Zr (%) | Pot Life (mins.) | Shore "A" Hardness after 24 Hours |
|---|---|---|---|---|
| A (Comp. Ex.) | 0.12 | — | 8 | 14 |
| B | 0.12 | 0.10 | 11 | 20 |
| C | 0.12 | 0.17 | 19 | 13 |
| D | 0.12 | 0.25 | 33 | 10 |
| E | 0.155 | 0.10 | 10 | not tested |
| F | 0.155 | 0.22 | 23.5 | 20 |
| G | 0.155 | 0.35 | 39 | 18 |
| H | 0.165 | 0.35 | 39 | 19 |

-continued

| Example | Bi (%) | Zr (%) | Pot Life (mins.) | Shore "A" Hardness after 24 Hours |
|---|---|---|---|---|
| I | 0.187 | 0.35 | 31 | 20 |

The examples show that the addition of a zirconium carboxylate to a bismuth carboxylate-catalyzed urea-/urethane-forming reaction provide for an extended pot life. In addition, many of the samples tested also cure to a tack-free state within 24 hours.

What is claimed is:

1. A composition comprising an isocyanate-reactive compound and a catalyst comprising a bismuth carboxylate and a zirconium carboxylate, wherein the catalyst is present in an amount sufficient to catalyze a reaction with the isocyanate-reactive compound and a polyisocyanate.

2. The composition of claim 1 wherein the isocyanate-reactive compound has an equivalent weight of at least about 1,000.

3. The composition of claim 1 wherein the isocyanate-reactive compound has an equivalent weight of no greater than about 2,000.

4. The composition of claim 1 wherein the carboxylate portion of the bismuth carboxylate and zirconium carboxylate contains from 6 to 22 carbon atoms.

5. The composition of claim 1 wherein the bismuth carboxylate is a bismuth salt of a $C_{8-12}$ carboxylic acid.

6. The composition of claim 1 wherein the bismuth carboxylate is a bismuth salt of mixture of $C_{9-11}$ tertiary saturated carboxylic acids.

7. The composition of claim 1 wherein the zirconium carboxylate is a zirconium salt of a $C_{8-12}$ carboxylic acid.

8. The composition of claim 1 wherein the zirconium carboxylate is a zirconium salt of mixture of octoic and neodecanoic acids.

9. A process for preparing a composition, which comprises contacting an isocyanate-reactive compound with a polyisocyanate, in the presence of an effective amount of a catalyst comprising a bismuth carboxylate and a zirconium carboxylate, under reaction conditions sufficient to form a composition containing at least one urethane group.

10. The process of claim 9 wherein the isocyanate-reactive compound has an equivalent weight of at least about 1,000.

11. The process of claim 9 wherein the isocyanate-reactive compound has an equivalent weight of no greater than about 2,000.

12. The process of claim 9 wherein the carboxylate portion of the bismuth carboxylate and zirconium carboxylate contains from 6 to 22 carbon atoms.

13. The process of claim 9 wherein the bismuth carboxylate is a bismuth salt of a $C_{8-12}$ carboxylic acid.

14. The process of claim 9 wherein the bismuth carboxylate is a bismuth salt of mixture of $C_{9-11}$ tertiary saturated carboxylic acids.

15. The process of claim 9 wherein the zirconium carboxylate is a zirconium salt of a $C_{8-12}$ carboxylic acid.

16. The process of claim 9 wherein the zirconium carboxylate is a zirconium salt of mixture of octoic and neodecanoic acids.

17. The process of claim 9 wherein the polyisocyanate is 1-isocyanato-3,3,5-trimethyl-5-isocyanato methyl cyclohexane, diphenylmethane-4,4'-diisocyanate, toluene-2,4-diisocyanate, toluene-2,6-diisocyanate, or a mixture thereof.

18. The process of claim 9 wherein the polyisocyanate is diphenylmethane-4,4'-diisocyanate.

19. The process of claim 18 wherein the polyisocyanate comprises a prepolymer of diphenyl-methane-4,4'-diisocyanate and has a free NCO content of at least about 3 percent.

20. The process of claim 18 wherein the polyisocyanate comprises a prepolymer of diphenylmethane-4,4'-diisocyanate and has a free NCO content of no greater than about 4 percent.

21. A process wherein a polyurethane-forming composition including an isocyanate-reactive compound, a polyisocyanate and a catalyst is applied to a surface of a substrate and subsequently cured to form an adherent polyurethane layer, the improvement wherein said catalyst comprises a catalytic amount of a bismuth carboxylate and a zirconium carboxylate.

22. The process of claim 21 wherein the substrate is a textile.

23. The process of claim 22 wherein the polyurethane-forming composition is cellular.

* * * * *